US011716520B2

(12) United States Patent
Zheng et al.

(10) Patent No.: US 11,716,520 B2
(45) Date of Patent: Aug. 1, 2023

(54) SYSTEMS AND METHODS FOR PROVIDING OPTIMIZED TIME SCALES AND ACCURATE PRESENTATION TIME STAMPS

(71) Applicant: Netflix, Inc., Los Gatos, CA (US)

(72) Inventors: Weiguo Zheng, San Jose, CA (US); Rex Yik Chun Ching, San Ramon, CA (US); Yongjun Jeon, Los Gatos, CA (US); Chandrika Kasi, San Jose, CA (US)

(73) Assignee: Netflix, Inc., San Jose, CA (US)

( * ) Notice: Subject to any disclaimer, the term of this patent is extended or adjusted under 35 U.S.C. 154(b) by 0 days.

(21) Appl. No.: 17/359,468

(22) Filed: Jun. 25, 2021

(65) Prior Publication Data
US 2022/0417620 A1 Dec. 29, 2022

(51) Int. Cl.
*H04N 21/8547* (2011.01)
*G11B 27/34* (2006.01)
*H04N 21/2343* (2011.01)

(52) U.S. Cl.
CPC ......... *H04N 21/8547* (2013.01); *G11B 27/34* (2013.01); *H04N 21/234381* (2013.01)

(58) Field of Classification Search
CPC ....... H04N 21/8547; H04N 21/234381; G11B 27/34
See application file for complete search history.

(56) References Cited

U.S. PATENT DOCUMENTS

2004/0125124 A1\* 7/2004 Kim .................. G06F 16/7847
2006/0248559 A1 11/2006 Michener et al.
2007/0168188 A1 7/2007 Choi
2014/0140417 A1\* 5/2014 Shaffer ............ H04N 21/23608
375/240.28
2014/0297291 A1\* 10/2014 Baumgarte ............. G10L 19/02
704/500
2021/0044777 A1 2/2021 Zheng et al.

FOREIGN PATENT DOCUMENTS

WO WO-2012068898 A1 \* 5/2012 ..... H04N 21/234327
WO 2022/272135 12/2022
WO 2022272135 A1 12/2022

OTHER PUBLICATIONS

International Search Report and Written Opinion received for PCT Application Serial No. PCT/US2022/035002 dated Oct. 10, 2022, 12 pages.
PCT/US2022/035002 International Search Report and Written Opinion dated Oct. 10, 2022.

\* cited by examiner

*Primary Examiner* — Thai Q Tran
*Assistant Examiner* — Jose M Mesa
(74) *Attorney, Agent, or Firm* — Greenberg Traurig, LLP

(57) ABSTRACT

The disclosed computer-implemented method includes determining, for multiple different media items, a current time scale at which the media items are encoded for distribution, where at least two of the media items are encoded at different frame rates. The method then includes identifying, for the media items, a unified time scale that provides a constant frame interval for each of the media items. The method also includes changing at least one of the media items from the current time scale to the identified unified time scale to provide a constant frame interval for the changed media item(s). Various other methods, systems, and computer-readable media are also disclosed.

20 Claims, 15 Drawing Sheets

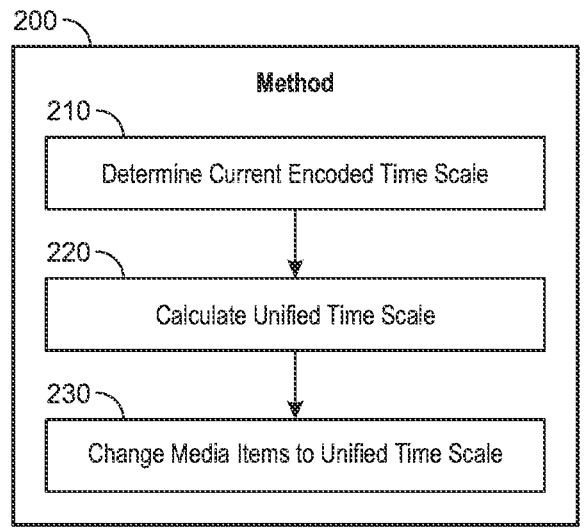
FIG. 2
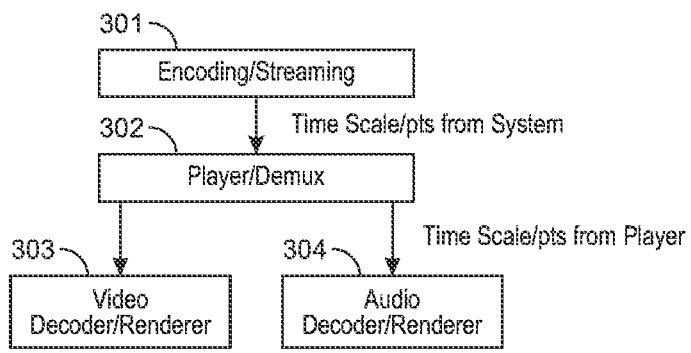
FIG. 3
| Time Scale / Frame Rate | 1,000 | 90,000 | 1,000,000 |
|---|---|---|---|
| 24 | 41.66666667 | 3750 | 41666.6667 |
| 25 | 40 | 3600 | 40000 |
| 30 | 33.33333333 | 3000 | 33333.3333 |
| 60 | 16.66666667 | 1500 | 16666.6667 |
| 23.97602398 | 41.70833333 | 3753.75 | 41708.3333 |
| 29.97002997 | 33.36666667 | 3003 | 33366.6667 |
| 59.94005994 | 16.68333333 | 1501.5 | 16683.3333 |
Frame Interval
FIG. 4

| Frame # | Source Timestamp (s) (23.97fps) | Source Timestamp (ms) | Frame Interval (ms) |
|---|---|---|---|
| 0 | 0.0000 | 0 | |
| 1 | 0.0417 | 42 | 42 |
| 2 | 0.0834 | 83 | 41 |
| 3 | 0.1251 | 125 | 42 |
| 4 | 0.1668 | 167 | 42 |
| 5 | 0.2085 | 209 | 42 |
| 6 | 0.2503 | 250 | 41 |
| 7 | 0.2920 | 292 | 42 |
| 8 | 0.3337 | 334 | 42 |
| 9 | 0.3754 | 375 | 41 |

PTS Rounding Error and Frame Interval

FIG. 5

| V-syncTime Slot (ms) (50Hz) | Frame # | PTS without Rounding | PTS with Rounding | Frame # |
|---|---|---|---|---|
| 0 | 0 | 0 | 0 | 0 |
| 20 | 0 | | | 0 |
| 40 | 0 | | | 0 |
| 60 | 1 | 41.66667 | 42 | 1 |
| 80 | 1 | | | 1 |
| ... | ... | ... | ... | ... |
| 1380 | 33 | 1376.4 | 1376 | 33 |
| 1400 | 33 | | | 33 |
| 1420 | 34 | 1418.1 | 1418 | 34 |
| 1440 | 34 | | | 34 |
| 1460 | 35 | 1,459.8 | | 34 |
| 1480 | 35 | | 1460 | 35 |
| 1500 | 35 | | | 35 |
| 1520 | 36 | 1501.5 | | 36 |

23.97fps to 50Hz FRCz FRC

FIG. 6

| Scale Frame Rate \ Time | 1,000 | 90,000 | 1,000,000 | 120,000 |
|---|---|---|---|---|
| 24 | 41.66666667 | 3750 | 41666.6667 | 5000 |
| 25 | 40 | 3600 | 40000 | 4800 |
| 30 | 33.33333333 | 3000 | 33333.3333 | 4000 |
| 60 | 16.66666667 | 1500 | 16666.6667 | 2000 |
| 23.97602398 | 41.70833333 | 3753.75 | 41708.3333 | 5005 |
| 29.97002997 | 33.36666667 | 3003 | 33366.6667 | 4004 |
| 59.94005994 | 16.68333333 | 1501.5 | 16683.3333 | 2002 |
| 120 | 8.333333333 | 750 | 8333.33333 | 1000 |
| 240 | 4.166666667 | 375 | 4166.66667 | 500 |
| 300 | 3.333333333 | 300 | 3333.33333 | 400 |

Video Frame Intervals

FIG. 7

| Frame Rate \ Time Scale | 1,000 | 90,000 | 1,000,000 | 120,000 |
|---|---|---|---|---|
| 23.4273 (HEAAC) | 42.66666667 | 3840 | 42666.6667 | 5120 |
| 31.25 (DDP/Atmos) | 32 | 2880 | 32000 | 3840 |

Audio Frame Intervals @48KHz

FIG. 8

| Frame Rate \ Time Scale | 1,000 | 90,000 | 1,000,000 | 120,000 |
|---|---|---|---|---|
| 15.625 (HEAAC) | 64 | 5760 | 64000 | 7680 |
| 20.83333333 (DDP/Atmos) | 32 | 4320 | 48000 | 5760 |

Audio Frame Intervals @32KHz

FIG. 9

| Sample Rate (1001) | Frame Size (1002) | Time Scale / Frame Rate (1003) | 1,000 (1004) | 90,000 (1005) | 1,000,000 (1005) | 120,000 (1007) | 17,640,000 (1008) |
|---|---|---|---|---|---|---|---|
| 24 | 1 | 24 | 41.66666667 | 3750 | 41666.6667 | 5000 | 735000 |
| 25 | 1 | 25 | 40 | 3600 | 40000 | 4800 | 705600 |
| 30 | 1 | 30 | 33.33333333 | 3000 | 33333.3333 | 4000 | 588000 |
| 60 | 1 | 60 | 16.66666667 | 1500 | 16666.6667 | 2000 | 294000 |
| 23.97 | 1 | 23.97602398 | 41.70833333 | 3753.75 | 41708.3333 | 5005 | 735735 |
| 29.97 | 1 | 29.97002997 | 33.36666667 | 3003 | 33366.6667 | 4004 | 585588 |
| 59.94 | 1 | 59.94005994 | 16.68333333 | 1501.5 | 16683.3333 | 2002 | 294294 |
| 120 | 1 | 120 | 8.333333333 | 750 | 8333.33333 | 1000 | 147000 |
| 240 | 1 | 240 | 4.166666667 | 375 | 4166.66667 | 500 | 73500 |
| 300 | 1 | 300 | 3.333333333 | 300 | 3333.33333 | 400 | 58800 |
| 8000 | 2048 | 3.90625 | 256 | 23040 | 256000 | 30720 | 4515840 |
|  | 1536 | 5.208333333 | 192 | 17280 | 192000 | 23040 | 3386880 |
| 32000 | 2048 | 15.625 | 64 | 5760 | 64000 | 7680 | 1128960 |
|  | 1536 | 20.83333333 | 48 | 4320 | 48000 | 5760 | 846720 |
| 44100 | 2048 | 21.53320313 | 46.4399093 | 4179.59184 | 46439.9093 | 5572.789116 | 819200 |
|  | 1536 | 28.7109375 | 34.82993197 | 3134.69388 | 34829.932 | 4179.591837 | 614400 |
| 48000 | 2048 | 23.4375 | 42.66666667 | 3840 | 42666.6667 | 5120 | 752640 |
|  | 1536 | 31.25 | 32 | 2880 | 32000 | 3840 | 564480 |
| 96000 | 2048 | 46.875 | 21.33333333 | 1920 | 21333.3333 | 2560 | 376320 |
|  | 1536 | 62.5 | 16 | 1440 | 16000 | 1920 | 282240 |

Audio/Video Frame Intervals including 44100Hz Audio

*FIG. 10*

| Frame Rate (fps) | Scaled Frame Rate (V) |
|---|---|
| 23.976 | 24000 |
| 24 | 24 |
| 25 | 25 |
| 29.97 | 30000 |
| 30 | 30 |
| 50 | 50 |
| 59.94 | 60000 |
| 60 | 60 |

Scaled Frame Rate

FIG. 11

| Frame Rate (fps) | Scaled Frame Rate (V) | Time Scale |
|---|---|---|
| 23.976 | 24000 | 24000 |
| 24 | 24 | 3000 |
| 25 | 25 | 375 |
| 29.97 | 30000 | 30000 |
| 30 | 30 | 750 |
| 50 | 50 | 750 |
| 59.94 | 60000 | 60000 |
| 60 | 60 | 1500 |

Time Scale with 48KHz Audio

FIG. 12

Time Scale with 44.1KHz Audio

| Frame Rate (fps) | Scaled Frame Rate(V) | Time Scale | Wrap-Around Time (Hours) |
|---|---|---|---|
| 23.976 | 24000 | 24000 | 49.71 |
| 24 | 24 | 3000 | 397.68 |
| 25 | 25 | 375 | 3181.46 |
| 29.97 | 30000 | 30000 | 39.77 |
| 30 | 30 | 750 | 1590.73 |
| 50 | 50 | 750 | 1590.73 |
| 59.94 | 60000 | 60000 | 19.88 |
| 60 | 60 | 1500 | 795.36 |
| 120 | 120 | 3000 | 397.68 |
| 240 | 240 | 6000 | 198.84 |

Proposed AVI Time Scale and Wrap-Around Time with 48KHz Audio

| Frame# | PTS (ms) | Scaled PTS (us) | Native PTS (us) | Rounding Error (us) |
|---|---|---|---|---|
| 0 | 0 | 0 | 0 | 0 |
| 1 | 42 | 42000 | 41708 | 292 |
| 2 | 83 | 83000 | 83417 | -417 |
| 3 | 125 | 125000 | 125125 | -125 |
| 4 | 167 | 167000 | 166833 | 167 |
| 5 | 209 | 209000 | 208542 | 458 |
| 6 | 250 | 250000 | 250250 | -250 |
| 7 | 292 | 292000 | 291958 | 42 |
| 8 | 334 | 334000 | 333667 | 333 |
| 9 | 375 | 375000 | 375375 | -375 |
| 10 | 417 | 417000 | 417083 | -83 |
| 11 | 459 | 459000 | 458792 | 208 |
| 12 | 501 | 501000 | 500500 | 500 |
| 13 | 542 | 542000 | 542208 | -208 |
| 14 | 584 | 584000 | 583917 | 83 |

PTS Scaling

*FIG. 15*

SYSTEMS AND METHODS FOR PROVIDING OPTIMIZED TIME SCALES AND ACCURATE PRESENTATION TIME STAMPS

BACKGROUND

Media items, including audio and video media items, are typically generated with a presentation time stamp. The presentation time stamp (PTS) is a metadata field that is applied to a media item to keep the media item's various elementary streams (e.g., audio, video, subtitles, etc.) in synchronization. The metadata identifies specific points in time defined by a clock reference that is also transported as part of the media item. These points in time are references that define positions at which the underlying elementary streams are to be in sync. The presentation time stamp itself is an N-bit number that represents the value of a counter driven by a clock with a time scale of X-Hz. In Moving Pictures Expert Group (MPEG) 1 and 2 encoding, for example, the N value of the PTS is 33 bits and the X value for the time scale is 90,000 Hz.

Despite having these presentation time stamps, however, seamless synchronization may be held back by approximations and fluctuations in the amount of time various audio and video frames are presented during playback.

SUMMARY

As will be described in greater detail below, the present disclosure describes methods and systems for providing optimized time scales and accurate presentation time stamps in media items.

In one example, a computer-implemented method for providing optimized time scales and accurate presentation time stamps includes determining, for multiple different media items, a current time scale at which the media items are encoded for distribution, where at least two of the media items are encoded at different frame rates. The method also includes identifying, for the media items, a unified time scale that provides a constant frame interval for each of the media items. The method further includes changing at least one of the media items from the current time scale to the identified unified time scale to provide a constant frame interval for the changed media item(s).

In some embodiments, the media items are video media items. In some cases, the video media items are encoded at 23.97, 24, 25, 29.97, 30, 59.94, 60, 120, 240, or 300 frames per second.

In other embodiments, the media items are audio media items. In some examples, the audio media items have a frame size of 1024, 1536, or 2048- samples per frame.

In some cases, each of the media items in a specified group of media items has a specified video frame rate and audio frame rate. In such cases, the unified time scale is calculated to optimize the specified video frame rate and the specified audio frame rate of the media items in the group.

In some embodiments, the unified time scale is implemented to generate one or more presentation time stamps (PTSs) for the media items. In some cases, the PTSs are monotonically increasing, and units used in the unified time scale are selected to maximize wrap-around time for the media items.

In some cases, the units selected to maximize wrap-around time for the media items are selected based on video frame rate. In some examples, the identified unified time scale includes a presentation time stamp interval. In such cases, the PTS interval may include a minimum frame interval or a multiple of a minimum frame interval. In some embodiments, the method also includes restoring the PTS interval to a specified resolution. In some cases, the identified unified time scale allows the media items to be streamed at a variable frame rate while maintaining the constant frame interval for each frame rate. In some embodiments, media items with different frame rates are streamed at a variable frame rate while maintaining the constant frame interval for each frame rate using the unified time scale. In some examples, media items having video content that was captured using a variable refresh rate are streamed at a variable frame rate while maintaining the constant frame interval using the unified time scale.

In some embodiments, identifying the unified time scale includes converting input presentation time stamps from the different media items having different time scales into PTSs based on the unified time scale. In some cases, implementing the converted input PTSs avoids PTS counter wrap-around. In some examples, changing at least one of the media items from the current time scale to the identified unified time scale allows a single fixed V-Synch interrupt to be implemented during playback of the plurality of media items. In some cases, the method further includes optimizing PTSs for the media items, such that scaled presentation time stamps match native PTSs without a resulting rounding error.

In addition, a corresponding system includes at least one physical processor and physical memory comprising computer-executable instructions that, when executed by the physical processor, cause the physical processor to: determine, for each of a plurality of different media items, a current time scale at which the media items are encoded for distribution, wherein at least two of the plurality of media items are encoded at different frame rates, identify, for the plurality of media items, a unified time scale that provides a constant frame interval for each of the plurality of media items, and change at least one of the plurality of media items from the current time scale to the identified unified time scale to provide a constant frame interval for the at least one changed media item.

In some examples, the above-described method may be encoded as computer-readable instructions on a computer-readable medium. For example, a computer-readable medium may include one or more computer-executable instructions that, when executed by at least one processor of a computing device, may cause the computing device to determine, for each of a plurality of different media items, a current time scale at which the media items are encoded for distribution, wherein at least two of the plurality of media items are encoded at different frame rates, identify, for the plurality of media items, a unified time scale that provides a constant frame interval for each of the plurality of media items, and change at least one of the plurality of media items from the current time scale to the identified unified time scale to provide a constant frame interval for the at least one changed media item.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the present disclosure.

FIG. 2 is a flow diagram of an exemplary method for providing optimized time scales and accurate presentation time stamps in media items.

FIG. 3 is a flow diagram illustrating time scale information in media items at different layers.

FIG. 4 illustrates a table that shows different time frame intervals for media items encoded at different frame rates.

FIG. 5 illustrates a table highlighting the occurrence of presentation time stamp rounding errors that cause different frame interval lengths.

FIG. 6 illustrates a table showing how V-sync relates to PTS with rounding and PTS without rounding.

FIG. 7 illustrates a table showing video frame intervals for media items encoded at different frame rates.

FIG. 8 illustrates a table showing audio frame intervals for media items encoded at different frame rates.

FIG. 9 illustrates an alternate table showing audio frame intervals for media items encoded at different frame rates.

FIG. 10 illustrates a table showing audio/video frame intervals for sample rates up to 96 kHz.

FIG. 11 illustrates a table showing a scaled frame rate for video encoded at 23.976 fps.

FIG. 12 illustrates a table showing an example time scale with 48 kHz audio.

FIG. 14 illustrates a table showing an example time scale and wrap-around time with 48 kHz audio.

FIG. 15 illustrates a table showing an example of presentation time stamp scaling.

Figure 1:
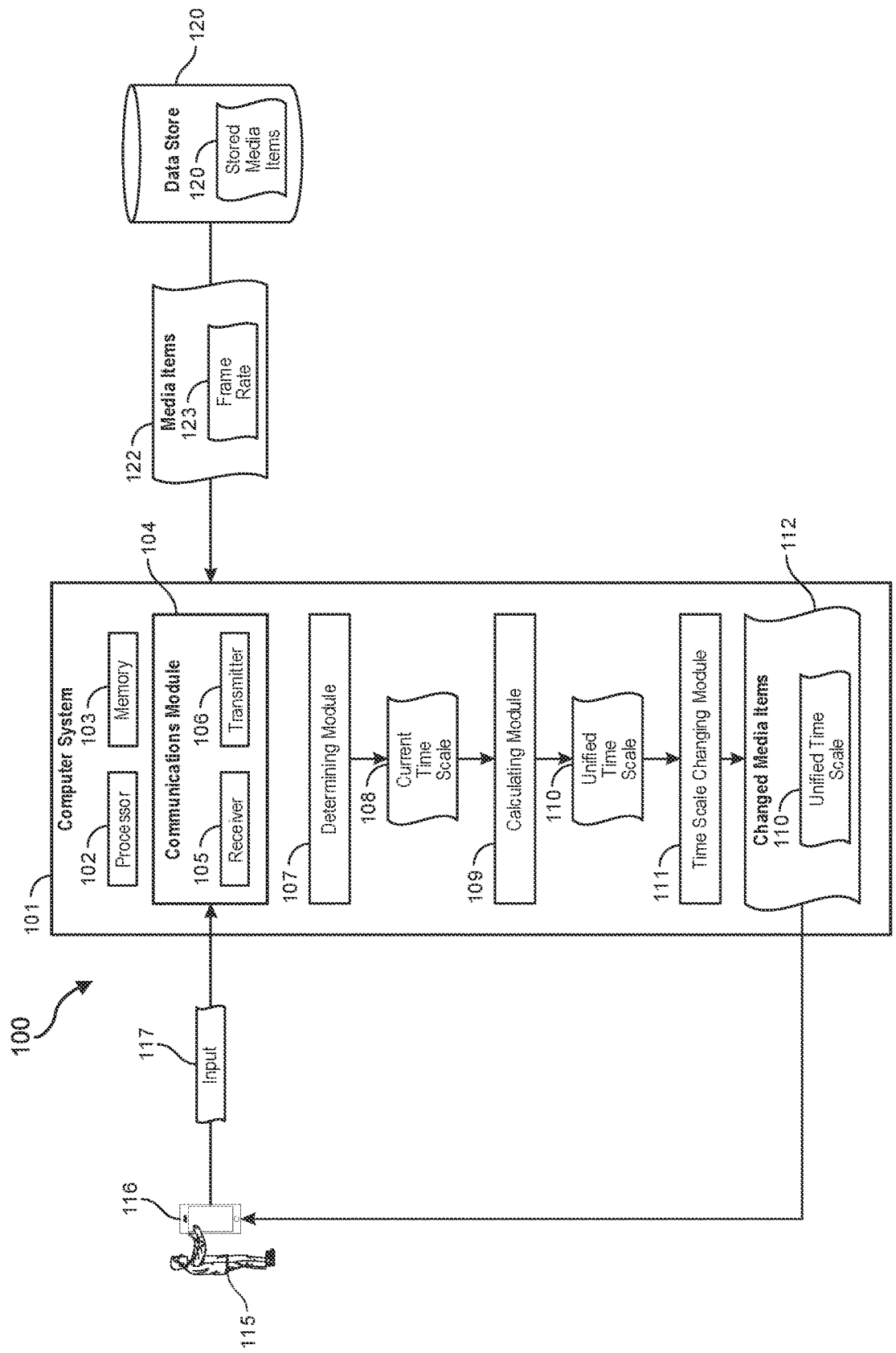
FIG. 1 illustrates a computing environment in which accurate presentation time stamps and optimized time scales are provided.
Figure 13:
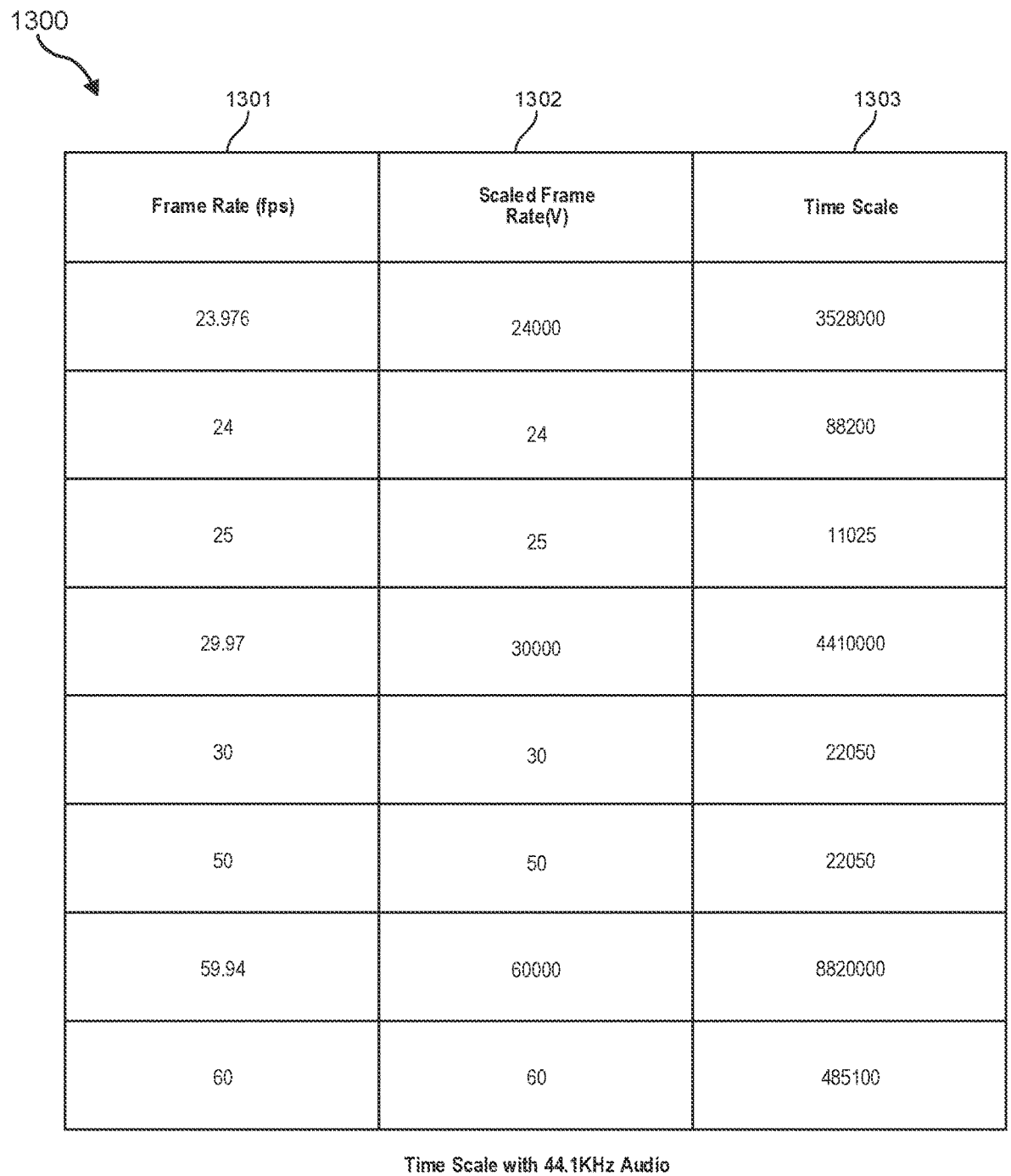
FIG. 13 illustrates a table showing an example time scale for audio at 44.1 kHz.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to providing optimized time scales and accurate presentation time stamps in media items. As will be explained in greater detail below, embodiments of the present disclosure generate a unified time scale that provides constant frame intervals during media item playback, even if those media items are encoded at different frame rates.

As mentioned above, media items are typically encoded with presentation time stamps (PTSs). The presentation time stamps provide points at which different elementary streams can be synchronized. These elementary streams include audio streams, video streams, and subtitles. If any of these elementary streams are leading or lagging behind each other during media item playback, users will typically notice the lack of synchronization and may be bothered by the poor playback experience.

The presentation time stamp itself is an N-bit number that represents the value of a counter that is driven by a clock with a specified time scale measured in Hertz (Hz). For MPEG 1 and 2, N=33 bits and X=90,000 Hz. Different time scales are used for media items encoded at different frame rates. For example, video may be encoded at 24 frames per second (fps), 29.97 fps, 30 fps, 50 fps, 59.94 fps, 60 fps, or at other frame rates. The amount of tick for the duration that each frame is displayed is different at different time scales. For instance, at a frame rate of 24 fps, and a time scale of 1,000 ticks/sec, the duration each frame is displayed (i.e., the "frame interval") would be 1,000/24=41.66667 ms. Accordingly, in this example, a video encoded at 24 fps would have a frame interval of 41 ms or 42 ms. If the time scale is changed, for example, to 90,000 Hz, the frame interval would be much more accurate, at (90,000/24) or 3750 ticks And, for instance, if the time scale is increased to 1,000,000 ticks/sec, for example, the frame interval would be 41,666 or 41,667 microseconds (1,000,000/24).

Since the value of the presentation time stamp is presented as an integer, these fractional numbers (e.g., 41.66667 ms, 41,666.6667 us, etc.) need to be rounded up or down to the nearest integer. This rounding process to the nearest integer results in a rounding error in the presentation time stamp. This rounding error causes the frame interval (i.e., the duration of time each frame is displayed) to shift up or down. In the case of video encoded at 24 fps and a time scale of 1,000 units, for example, the frame interval of 41.66667 ms thus continually switches between 41 and 42 ms as 41.66667 is rounded up or down to maintain synchronization. This continuous shifting between different frame intervals may have detrimental effects on media item playback. For example, the shifting between frame intervals may become tiring on the user's eyes. Moreover, at least in some cases, this shifting between different frame intervals causes other problems including frame drops, frame freezes, repeated frames, blank frames, or may lead to other playback or synchronization problems that are noticeable to a user and detract from the user's viewing experience.

The embodiments described herein, on the other hand, are designed to provide a universal time scale that will apply to a variety of different frame rates. The universal time scale ensures that each frame of a media item is played back at a constant frame interval. The systems described herein identify a current time scale at which a set of media items (e.g., an audio or video media item) are encoded. These systems also determine the frame rate at which the media items are encoded. The systems then determine a least common multiplier of the various frame rates used in the media items. For instance, at a unified time scale determined by identifying the least common multiplier of the scaled frame rates for a group of media items, each media item will be divided into the same number of ticks/sec. This unified number of ticks/sec results in frame intervals that are constant for each media item, regardless of the frame rate in which that media item was encoded. By identifying the least common multiplier that applies to each scaled frame rate used in the group of media items, each frame interval may be presented as a whole integer value. By providing the frame interval as a whole integer value for each media item, the frame intervals no longer fluctuate between different values (e.g., the fluctuations between 41 ms and 42 ms in the above example). And, because the frame interval is made constant by the unified time scale, the problems associated with a changing frame interval are also either subdued or eliminated entirely.

In some cases, the embodiments described herein may also optimize the unified time scale for specific audio or video format combinations. For instance, instead of finding a least common multiplier for a wide range of different media items encoded at different frame rates, the systems herein find the least common multiplier for a selected audio/video format combination and change the time scale for that combination specifically. This reduces the likelihood that memory buffers configured to store presentation time stamp values will overflow. Indeed, as noted above, the presentation time stamp is a monotonically increasing integer value that, at some point, will grow to a very large number. If a bit field for storing the PTS is too low, the monotonically increasing PTS value will overfill its buffer, potentially very early in the playback of the media item. By optimizing the time scale for a specific audio/video format combination, a smaller time scale may be used in which frame intervals are longer and the number of increments in the presentation time stamp counter is correspondingly lower. By optimizing the time scale for each media item or for each specific group of media items, the embodiments herein provide a smoother and more reliable playback experience for the viewing user that is less prone to memory overrun errors.

The following will provide, with reference to FIGS. 1-21, detailed descriptions of the various tables, illustrations, and flow diagrams. FIG. 1, for example, illustrates a computing environment 100 in which unified time scales are identified and applied to media items. FIG. 1 includes various electronic components and elements including a computer system 101 that is used, alone or in combination with other computer systems, to perform tasks associated with storing digital content. The computer system 101 may be substantially any type of computer system including a local computer system or a distributed (e.g., cloud) computer system. The computer system 101 includes at least one processor 102 and at least some system memory 103. The computer system 101 includes program modules for performing a variety of different functions. The program modules may be hardware-based, software-based, or may include a combination of hardware and software. Each program module uses computing hardware and/or software to perform specified functions, including those described herein below.

In some cases, the communications module 104 is configured to communicate with other computer systems. The communications module 104 includes substantially any wired or wireless communication means that can receive and/or transmit data to or from other computer systems. These communication means include, for example, hardware radios such as a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 is configured to interact with databases, mobile computing devices (such as mobile phones or tablets), embedded computing systems, or other types of computing systems.

The computer system 101 further includes a determining module 107. The determining module 107 is configured to determine a current frame rate 123 of various media items 122. In some cases, these media items 122 are selected from various stored media items 121 retained in a data store 120. The data store 120 may be local or remote, and may be a distributed (e.g., cloud-based) data store. The media items 122 include audio items, video items, or any type of media item that is encoded for playback on a user device (e.g., device 116 of user 115). The determining module 107 is configured to access these media items 122 and determine the frame rate 123 at which they are encoded. The frame rate defines how many frames are designed to be presented on a playback device each second. In some cases, for example, the video media items are encoded at 23.97, 24, 25, 29.97, 30, 59.94, 60, 120, 240 or 300 frames per second. Audio frame rates may include 23.4375 frames per second, 31.25 frames per second, or some other encoded frame rate.

The determining module 107 also determines a current time scale 108 being used in conjunction with the media items 122. The time scale is measured in ticks or units per second. In cases where the time scale is 1,000, for example, the time scale divided by the frame rate (e.g., 24 fps) (1000/24=41.6667 ms) results in the frame interval, or the amount of time that each frame is displayed on the playback device. Many different time scales may be used in conjunction with different types of media items. Accordingly, the determining module 107 determines both the encoded frame rate 123 of the media item as well as the current time scale 108 used with that media item to determine each media item's frame interval (time scale/frame rate).

The identifying module 109 of computer system 101 then identifies or calculates a unified time scale 110 for the media items 122. The unified time scale 110, when applied to media items that have different encoded frame rates 123, results in constant frame intervals. As noted above, the continual rounding of non-integer values (e.g., 41.6667 ms) to integers results in added frames, dropped frames, blank frames, and other playback errors. These errors are noticeable to users and cause eye fatigue and strain, while detracting from a smooth and seamless playback experience. The time scale changing module 111 takes the identified unified time scale 110 and changes one or more of the media items 122, resulting in changed media items 112 that are ready for playback using the unified time scale 110. Then, when a user (e.g., 115) selects a media item to stream or download (e.g., from data store 120) via input 117, that media item will be changed to a unified time scale that provides a constant frame interval. The constant frame interval, in turn, will lead to a smooth and reliable playback experience, free of blank frames, dropped frames, added frames, or other noticeable defects. These embodiments will be described in greater detail below with regard to method 200 of FIG. 2 and with regard to the embodiments shown in FIGS. 3-21.

FIG. 2 is a flow diagram of an exemplary computer-implemented method 200 for providing optimized time scales and accurate presentation time stamps in media items. The steps shown in FIG. 2 may be performed by any suitable computer-executable code and/or computing system, including the system illustrated in FIG. 1. In one example, each of the steps shown in FIG. 2 represents an algorithm whose structure includes and/or is represented by multiple sub-steps, examples of which will be provided in greater detail below.

As illustrated in FIG. 2, at step 210, one or more of the systems described herein may determine, for each of a plurality of different media items (e.g., 122 of FIG. 1), a current time scale 108 at which the media items are encoded for distribution. At least two of these media items 122 are encoded at different frame rates. Next, at step 220, the systems described herein identify, for the media items, a unified time scale 110 that provides a constant frame interval for each of the media items 122. Then, at step 230, the systems change at least one of the media items from the current time scale 108 to the identified unified time scale 110 to provide a constant frame interval for the changed media item(s).

As shown in FIG. 3, and as noted above, in order to keep audio and video playback in sync (e.g., lip-sync), time stamps are periodically applied to each video and audio frame. A time stamp, as noted above, is a N-bit number that represents the value of a counter driven by a clock with a time scale of X-Hz. Decoders (e.g., 303) do not necessarily get time scale information and presentation time stamps directly from the encoding/streaming container 301. Rather, at least in some cases, such timing information is provided by or determined in the media player/demux device. The player/demux 302 may perform a scaling process in order to provide a unified time scale for the ease of implementation and control. The video decoder 303 and/or audio decoder 304 will use the time info from the player/demux 302 if it is available. If not, the audio or video decoders will use the elementary stream time info. If both are unavailable, a hardware-based decoder will attempt to play back the media item without time information. As such, at least in some cases, player/demux 302 time information has the highest priority, while the elementary stream time information has a lower priority.

Presentation time stamps indicate where a particular access unit (AU) belongs in time. When a decoder (e.g., 303 or 304) receives video and audio AUs, it decodes each AU and stores it into a memory buffer. When the reference clock reaches the value of the time stamp, the decoded AU is rendered on the playback device (e.g., 116 of FIG. 1). PTS controls how the AU is rendered. Video frame rates vary from 23.976 fps, 24 fps, 29.97 fps, 30 fps, 50 fps, 59.94 fps, to 60 fps or other frame rates. Presentation time stamps are used by V-Sync interrupt handlers to determine whether a corresponding audio/video frame should be rendered. One rule for rendering AU is to select the closest AU with a PTS value that is less than It (PTS'<Ti), where Ti is the system time of the presentation device's V-Sync interrupt or audio serial output interrupt, and PTS'=PTS+Δ, Δ is tolerance (Δ≥0). If PTS'>Ti, the current rendered AU is repeated. To simplify the description, at least some of the embodiments herein assume Δ=0;

Presentation time stamps performs a similar role in audio signals as well using a serial output interrupt handler. Audio frequencies are, at least in some examples, 32,000 Hz, 48,000 Hz, or 96,000 Hz. A 44.1 KHz domain is used primarily for delivering high-quality music. At least in some cases, the video V-sync interrupt and the audio serial output interrupt are not aligned during the rendering. As such, in order to achieve proper A/V sync, both video and audio presentation time stamps are referenced to a common clock (e.g., system time) with the same time scale. Some implementations may use the audio clock as the system time, which may be referred to as an audio master A/V sync scheme.

Presentation time stamp precision is defined by time scale (e.g., current time scale 108). PTS precision may be presented in the format of (number_of_ticks, time_scale). The time scale is the total number of ticks per second. Frame interval (i.e., the duration or amount of time each frame is presented on the playback device) is obtained by calculating time_scale/frame_rate. Table 400 of FIG. 4 illustrates multiple different frame intervals for media items encoded at different frame rates (402) that are presented on different time scales (401). As can be seen, the time scales 1,000, 90,000 or 1,000,000, result in fractional frame intervals, especially for frame rates such as 23.97 fps and 59.94 fps). Since PTS is presented as integer, these fractional numbers cause rounding errors in the actual presentation time stamps. Table 500 of FIG. 5 illustrates presentation time stamp values for the first 10 frames in 23.97 fps video with time scale value as 1,000 (equivalent to milliseconds). The frame numbers 0-9 (501) each have corresponding source time stamps (502) starting at 0, that progress each 41 or 42 ms (as shown in 503), resulting in an uneven and continuously changing frame interval (504) that changes between 42 and 41 ms.

From table 500, the following problems can be seen: with a rounding error up to 0.5 ms, the rounding error will impact the accuracy of frame rate conversion (e.g., frame rendering condition: Ti>PTS). Table 600 of FIG. 6 shows that, under rendering condition (Ti>PTS), frame #35 (column 602) should be shown in three V-sync slots (column 601) from 1460 ms to 1500 ms. However, due to rounding error, frame 34 is shown three times (column 605) from 1420 ms to 1460 ms instead. Similar irregularities will run through the playback of the entire media item due to the irregularities that arise when rounding the PTS value to the nearest integer (see the differences between the PTS values without rounding (column 603) and the PTS values with rounding (column 604).

Table 500 shows how the frame interval varies between 41 and 42 ms. This irregular frame interval breaks the regularity of the media item's frame rate. The irregular frame interval also prevents hardware or software implementation using a continuous timer to wake up rendering at the media item's frame rate with sufficient accuracy to provide smooth and reliable playback. This lack of accuracy in the PTS time scale, resulting in fractional frame intervals, leads to many problems (as noted above), at least some of which may be overcome using a unified time scale.

The embodiments described herein provide a solution that achieves constant frame intervals for different video frame rates (e.g., 23.97, 24, 25, 29.97, 30, 50, 59.94, 60, 120, 240 or 300 fps), where (frame interval=time scale/frame rate). At least in some embodiments, this may be equivalent to calculating a least common multiplier (LCM) of all the frame rates in a set of media items (e.g., LCM(24, 25, 30, 60, 120, 240, 24000, 30000, 60000)). This example reduces to LCM(24,000, 60,000)=120,000. In some cases, the LCM may be obtained from a lookup table that precalculates LCM values for different frame rate combinations. Accordingly, as shown in table 700 of FIG. 7, if the time scale is changed to 120,000 ticks/second, as opposed to 1,000, 90,000, or 1,000, 000 ticks/second as shown in the "time" row 701, then the frame interval for each frame rate (shown in the "scale frame rate" column) will be a whole number. For instance, the frame interval for 24 fps encoded video is 5,000 ms, the frame interval for 59.94 fps is 2002 ms, and the frame interval for video encoded at 120 fps is 1,000 ms. As can be seen, each of these are whole number values that provide a constant frame duration. This constant frame duration avoids blank frames, dropped frames, duplicated frames, playback errors or irregularities, and other anomalies that occur when different frame durations exist during playback.

For audio media items, HE-AAC encoding has a frame rate of 2048 or 1024 samples/frame and, at an audio sample rate of 48 KHz, the frame rate is 23.4375 or 46.875 fps, respectively. For Dolby Digital Atmos, the encoding has 1536 samples/frame, and is encoded at 31.25 fps. Table 800 of FIG. 8 shows a chart similar to that of FIG. 7, except for audio items. In table 800, the frame rate (802) of 23.4273 results in fractional numbers for time scales (801) of 1,000 and 1,000,000. However, when a unified time scale of 120,000 ticks/sec. is used, the frame rates of 23.4273 fps and 31.25 result in frame intervals of 5120 ticks and 3840 ticks respectively. As shown in table 900 of FIG. 9, at an audio sample rate of 32 KHz, time scales of 1000, 90,000 and 120,000 provide constant frame intervals for the frame rates 902 and time scales 901 shown.

In some embodiments, 44,100 Hz audio is used with video access units. In such cases, the time scale is much larger (17,640,000) to cover all the scenarios. Thus, as shown in table 1000 of FIG. 10, various sample rates are shown (1001), along with frame size (1002), frame intervals (1003), and different time scales (1004-1008). As can be seen in table 1000, a time scale with a value of 120,000 provides fixed frame intervals for video/audio format in the list, except for 44,100 Hz audio. If 44,100 Hz audio is to be provided, a time scale with a value of 17,640,000 would be universal to generate fixed frame intervals for each of the access unit formats shown in table 1000.

In some embodiments, the systems herein focus on a single video frequency and audio sample rate. In such cases, the following algorithm may be implemented to determine the minimum time scale that can generate fixed frame intervals for audio and video. The algorithm includes 1) Calculating the greatest common divisor (D) of (audio sample rate, frame sizes). For example, at a 48,000 Hz sample rate, frame sizes are 1536 (DDP) and 2048 (HE-AAC), D=GCD(48000, 1536, 2048)=128. 2) Δ=audio sample rate/D. With the 48,000 Hz sample rate from the above example, Δ=48,000/128=375. 3) Finding the scaled video frame rate V from table 11 of FIG. 11, which shows different media item frame rates in column 1101, and scaled frame rates in column 1102. 4) time scale=LCM (V, A). For example, let audio frequency be 48,000 Hz, the time scale can be calculated as shown in table 1200 of FIG. 12, using the frame rate 1201 and scaled frame rate 1202. In this embodiment, a single unified time scale is used for each of the available media item formats.

Since 33 bits are allocated for PTS 33 bit (e.g., in MPEG 1/2), it may be easier, at least in some embodiments, to get the unsigned 33-bit integer wrap-around (overflow) if the time scale value is larger. With a time scale of 90,000 ticks/sec, it will take about 26 hours to wrap around the PTS (i.e., overflow the memory buffer). Using a time scale of 120,000 ticks/sec., it will take about 19 hours to wrap around the PTS. But, with a time scale of 17,640,000 ticks/sec., it only takes about 8 mins. At least in some embodiments, it may be preferable to calculate the time scale for each specific video frame rate with 44.1 KHz audio. With 44.1 KHz audio, Δ=11,025, as shown in column 1303 of table 1300 in FIG. 13. Other frame rates 1301, scaled frame rates 1302, and time scale values 1303 are shown in table 1300.

PTS is presented as an integer value of a fixed number of bits. As such, as noted above, when the PTS is monotonically increasing, wrap-around occurs, in which a PTS value will overrun its (e.g., 33-bit) memory buffer. In one embodiment, AV1 provides an optional timing info container, and is defined in a 32 bit field. With 48 KHz audio, the algorithm described above may be implemented to obtain the time scale values 1203 in table 1200 and its corresponding wrap-around duration for unsigned 32 bit values. As a comparison, if the time scale is 90,000 ticks/sec., using 32 bit, the wrap-around time is approximately 13 hours. In embodiments where wrap-around time optimization is the goal, these embodiments select the optimized time scale based on the video frame rate. Then, using the time scale 1403 of table 1400 of FIG. 14, the resulting wrap-around time 1404 is shown for each selected frame rate 1401 and scaled frame rate 1402.

In some embodiments, a higher resolution PTS may be provided to avoid frame drop or freezing of playback. When the input PTS to the decoder or system is at a lower resolution, a scaling approach may be used to convert PTS from one time scale (TS) to another time scale (TS') using the following formula: PTS'=PTS*TS'/TS. However, at least in some cases, the PTS precision may be difficult to recover. For instance, as shown in table 1500 of FIG. 15, TS=1,000, and TS'=1,000,000. As can be seen, for each frame # (1501), a PTS (1502) is provided, along with a scaled PTS (1503), and a native PTS (1504). Each of these frames has a resulting rounding error (1505). Since the system knows that the minimum frame interval is to be constant based on the frame rate, the PTS interval is the minimum frame interval (D) or multiple of the minimum interval (N×D). For instance, given a time scale of 120,000, the minimum frame interval is D=5005 ticks for frame rate of 23.97 fps. The actual frame interval should be 5005 ticks or multiple of 5005 ticks, as shown in embodiment 1600 of FIG. 16, which shows a minimum interval (D) between frames 1601 and 1602, and a multiple (N) of (D) (10,010, between frames 1602 and 1603).

In some embodiments, an algorithm may be implemented to optimize or remaster the presentation time stamp. In this example, let $PTS_{in0}$ present PTS for the $1^{st}$ frame, Scale the first $PTS_{out0}$, where $PTS_{out0}=PTS_{in0}*TS_{out}/TS_{in}$.

Figure 17:
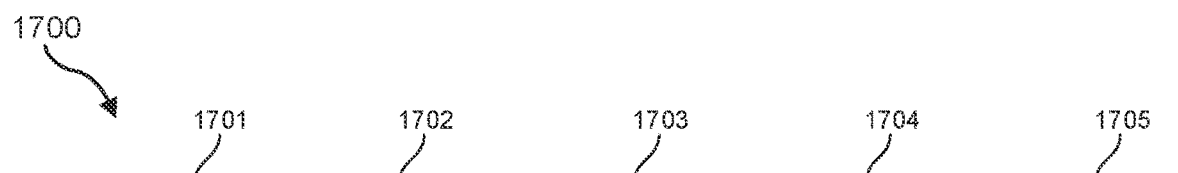
FIG. 17 illustrates a table showing optimized presentation time stamps with an initial PTS starting at zero.
Figure 18:
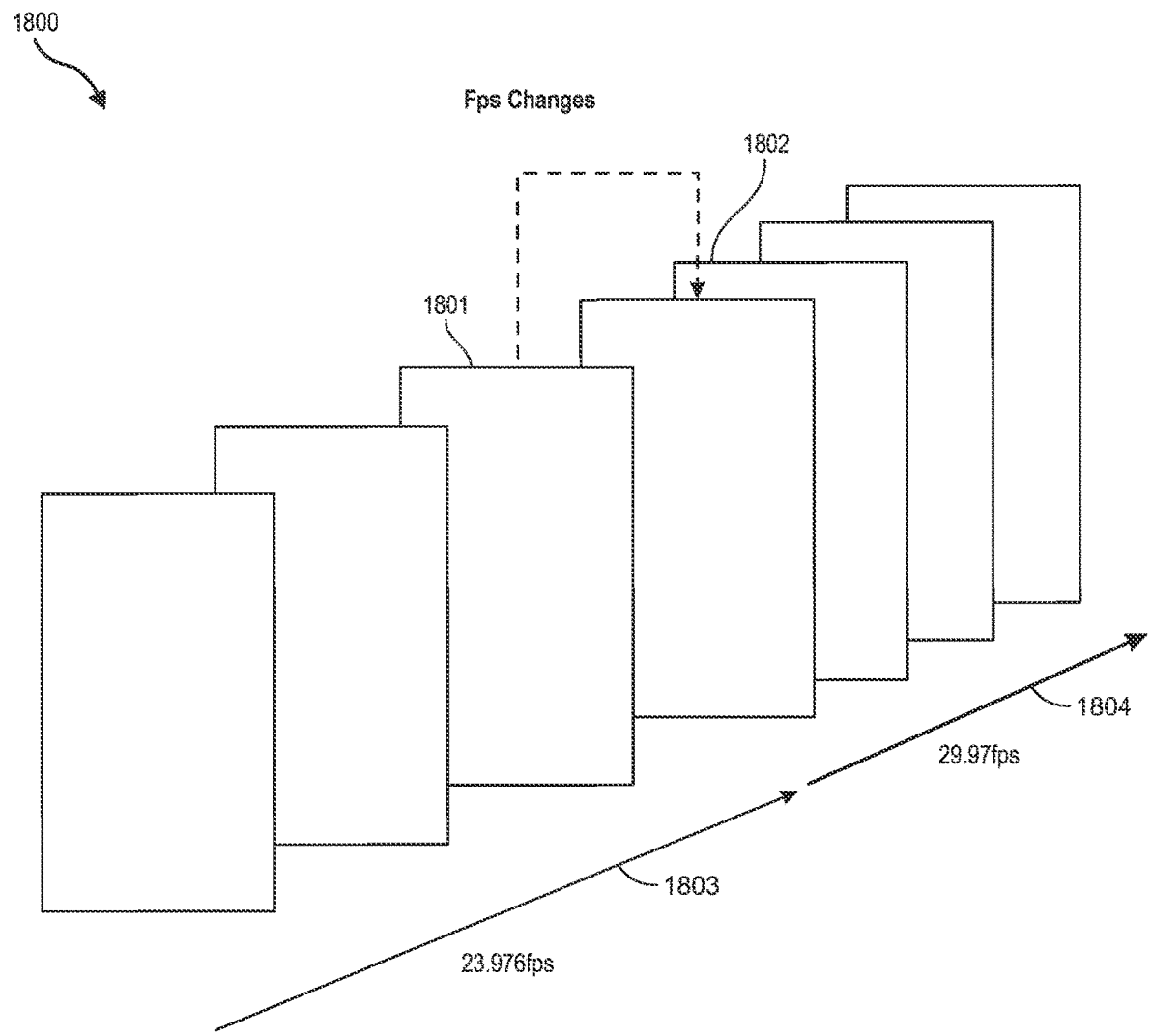
FIG. 18 illustrates an embodiment in which a frame rate is changed for different video segments.

The algorithm may include the following steps: 1) Compute the frame intervals ($D_{in}/D_{out}$) based on frame rate (F) and input/output time scales ($TS_{in}$, $TS_{out}$), where $D_{in}=TS_{in}/F$, and where $D_{out}=TS_{out}/F$. 2) Retrieve the frame index (I) based on current $PTS_{in}$ with the rounding function: I=round $((PTS_{in}-PTS_{in0})/D_{in})$. 3) The optimized/remastered PTS is $PTS_{out}=I*D_{out}+PTS_{out0}$ If the $PTS_{in}$ starts from 0, the above algorithm can (flawlessly, at least in some cases) restore the PTS in substantially any resolution. Otherwise, a constant initial offset may exist from $PTS_{out0}$ propagating through all $PTS_{out}$. The remastered PTS, as shown in table 1700 of FIG. 17, shows a rounding error 1705 of zero for each of the frame #'s 1701, PTS values 1702, remastered PTS values 1703, and native PTS values 1704. Having a rounding error zero indicates that each remastered PTS value will result in a constant frame interval at a given proper output time scale, thus alleviating the problems identified in media items that have fluctuating frame intervals.

In other embodiments, a unified time scale provides the basis for variable frame rate streaming. There are multiple scenarios in which variable frame rate streaming may be used. For instance, take video segments with different frame rates. A unified time scale is used for seamless frame rate switching to avoid black or blank displays. In this case, different video segments have different time scales, e.g., for wrap-around time optimization. Another embodiment is variable refresh rate (VRR) content capture and streaming. This use case happens at the source encoding end, and it's time scale should be consistent through different frame rates. For this case, from table 700, a time scale of 120,000 ticks/sec. is implemented to time scale VRR content capture and streaming, since it provides frame intervals in whole integer value for each frames rate in table 700.

For case one, as PTS is given as a pair (tick, time scale), the embodiments herein define the following algorithm below to provide PTS information based on a unified time scale ($TS_{out}$) for rendering on client playback devices with frame rate $F_0$ then being changed to $F_1$. Initially let $tick_{in0}$ present PTS for the $1^{st}$ frame, $TS_{in}=TS_{in0}$, $F=F_0$, scale the first $tick_{out0}$, where $tick_{out0}=tick_{in0}*TS_{out}/TS_{in}$. Then, the system uses the following routine to convert (tick, time scale) to new tick with a unified time scale: 1) Compute the frame intervals ($D_{in}/D_{out}$) based on frame rate (F) and input/output time scales ($TS_{in}$, $TS_{out}$), where $D_{in}=TS_{in}/F$, and where $D_{out}=TS_{out}/F$. 2) Retrieve the frame index (I) based on current $tick_{in}$ with the rounding function: I=round(($tick_{in}-tick_{in0}$)/Din). 3) The remastered tick is $tick_{out}=I*D_{out}+tick_{out0}$. 4) When the new time scale ($TS_{in1}$) is updated ($TS_{in}\neq TS_{in}$) with frame rate change ($F \neq F_1$), set $TS_{in}=TS_{in1}$, $tick_{in0}=tick_{out}*TS_{in}/TS_{out}$, $tick_{out0}=tick_{out}$, $F=F_1$.

As such, even if different video segments come with different time scales, the algorithm described above converts the input PTS into a more accurate PTS at the unified time scale. Since the above process is, at least in some embodiments, executed after encoding on the client playback device, the process can use a higher precision time scale as a united time scale, (e.g., with 64 bit precision), without having to monitor wrap-around. For this reason, at least in some embodiments, a time scale of 120,000 tick/sec. represents an optimized choice.

As noted above with reference to FIGS. 1 and 2, methods and systems may be provided that are configured to determine, for different media items (e.g., 122), a current time scale 108 at which each media item is encoded for distribution. These methods and systems are also configured to identify or calculate, for the media items, a unified time scale 110 that provides a constant frame interval for each of the media items, and then change at least one of the media items from the current time scale 108 to the unified time scale 110 to provide a constant frame interval for the changed media item(s) 112. In some cases, these media items are video media items encoded at different frame rates (e.g., 23.97, 24, 25, 29.97, 30, 59.94, 60, 120, 240 or 300 frames per second), while in other cases, the media items are audio media items having different frame rates (e.g., 1024, 1536, or 2048 samples per frame). In some examples, the media items are interactive media items that allow users to make decisions during playback that affect the ordering of scenes.

In some embodiments, a specific group of media items is selected. This group of media items may include video items, audio items, or a combination thereof. At least some of the media items in the group, at least in this example, have different specified video frame rates and/or audio frame rates. In such cases, the maximum range of frame rates is known for that group (e.g., from 24 fps to 60 fps). Then, when the identifying module 109 of FIG. 1 calculates or otherwise identifies the unified time scale 110, it does not need to look at multiple possible frame rates (in this case, above 60 fps and below 24 fps), but can focus on frame rates between 24-60 fps. Thus, the identifying module 109 can calculate or otherwise identify a unified time scale 110 that is specific to and optimized for this group of audio and/or video items. In such cases, the least common multiple may be much smaller than it would be for other groups of audio and/or video items, and thus, the unified time scale 110 would have fewer ticks/second, while still providing a constant frame interval for the various frame rates (between 24-60 fps in this example). This smaller number of ticks per second would reduce the wrap-around time of the monotonically increasing PTS value, thereby reducing the chances of overrunning PTS memory buffers. Once the unified time scale 110 has been determined for the selected group of media items, the time scale changing module 111 will change the media items to the unified time scale 110 by generating new presentation time stamps for those media items.

In some embodiments, where the presentation time stamps are monotonically increasing, units (i.e., number of ticks/sec.) used in the unified time scale are selected to maximize wrap-around time for the media items. Maximizing wrap-around time, at least in some cases, involves selecting the smallest number of units in the unified time scale 110 that will still allow for each media item to have a constant frame interval. Having a smaller number of units allows the monotonically increasing PTS value to increase more slowly. This slower monotonic increase allows for the amount of time that will be needed before reaching wrap-around time maximized. In some cases, the units selected to maximize wrap-around time for the media items are selected based on the video frame rate of video items, while in other cases, the units selected to maximize wrap-around time for the media items are selected based on the audio frame rate of audio items.

Figure 16:
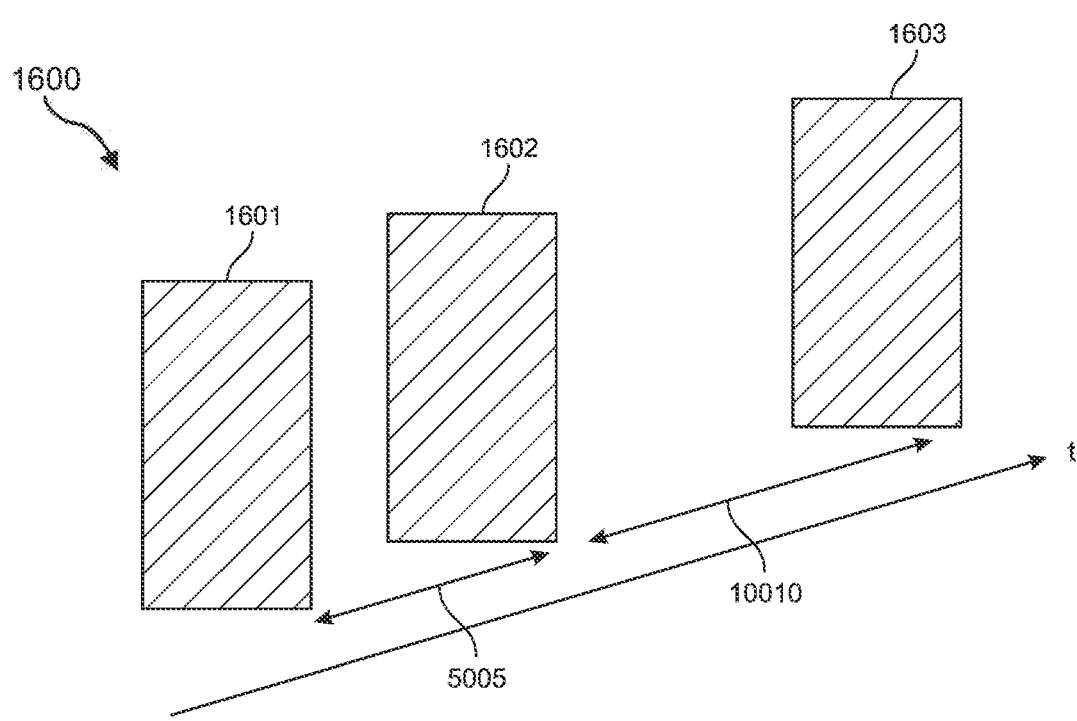
FIG. 16 illustrates an embodiment in which a minimum interval is calculated and implemented.

In some cases, the identified unified time scale 110 includes a presentation time stamp interval. The PTS interval may be different than the minimum, constant frame interval. The PTS interval includes a minimum frame interval or a multiple of a minimum frame interval. As shown in FIG. 16, for example, the interval between frames 1601 and 1602 is 5005 ms, which represents the minimum frame interval between frames 1601 and 1602. Whereas the frame interval between frames 1602 and 1603 is a multiple of 5005 (in this case, 5005×2 or 10010 ms). In some cases, the PTS interval may be restored or remastered to a specified resolution. In such cases, the PTS interval is calculated and applied to the media item in minimum, constant frame intervals, or in multiples of the minimum frame intervals. The remastering process thus includes determining a constant frame interval and using that determined constant frame interval to change the input time resolution (e.g., milliseconds, microseconds, nanoseconds, etc.) and output a different time resolution to ensure that scaled PTS intervals match the native PTS intervals with no rounding error. The remastered PTS interval is then applied to each frame in the media item. Thus, as shown in FIG. 17, the remastered PTS (1703) will have the same PTS interval as the native PTS (1704), thus eliminating the rounding error (1705) that would otherwise lead to skipped frames, added frames, blank frames, or other similar playback errors.

In some embodiments, the identified unified time scale 110 allows multiple media items to be streamed at variable frame rates while maintaining the constant frame interval. In some cases, the same media item may even switch between different frame rates. For instance, if the media item is an interactive video, some parts of the video may have been encoded at different frame rates on the server (distribution) side. In such cases, the server would provide the interactive media item at the different frame rates for playback on the user's playback device (e.g., 116). The playback device 116 then calculates and/or applies the unified time scale 110 that allows media items to be streamed at variable frame rates.

This unified time scale then results in a constant frame interval for the media item, including for interactive or other media items that are encoded at different frame rates. Thus, in such embodiments, media items with different frame rates may be streamed at a variable frame rate while maintaining the constant frame interval using the unified time scale. Similarly, at least in some embodiments, media items having video content that was captured using a variable refresh rate are streamed at a variable frame rate (from the server) and are played back at a constant frame interval using the unified time scale 110.

In some cases, identifying or calculating the unified time scale 110 includes converting input presentation time stamps from different media items having different time scales into PTSs based on the unified time scale. As noted above, this is generally shown in FIG. 17, in which remastered PTS values are devised to remove original rounding errors, thus being the same as the native PTS values. In some examples, using these converted input PTSs avoids PTS counter wrap-around or at least increases the amount of time before wrap-around occurs. Reducing the occurrence of wrap-around also reduces the various measures that need to be taken to ensure that wrap-arounds are smoothly handled without introducing additional playback errors. Thus, in this manner, providing a unified time scale ensures that each frame of a media item will have the same frame interval during playback. This is true whether the source encoding is encoded at the same frame rate throughout, or whether the source encoding changes throughout. Providing a constant time interval avoids many common playback issues, and provides users with a smoother, more reliable (and thus more enjoyable) media playback experience.

In some embodiments, a corresponding system is provided that includes at least one physical processor and physical memory comprising computer-executable instructions that, when executed by the physical processor, cause the physical processor to: determine, for each of a plurality of different media items, a current time scale at which the media items are encoded for distribution, wherein at least two of the plurality of media items are encoded at different frame rates, identify, for the plurality of media items, a unified time scale that provides a constant frame interval for each of the plurality of media items, and change at least one of the plurality of media items from the current time scale to the identified unified time scale to provide a constant frame interval for the at least one changed media item.

In other embodiments, a non-transitory computer-readable medium is provided that includes one or more computer-executable instructions that, when executed by at least one processor of a computing device, cause the computing device to: determine, for each of a plurality of different media items, a current time scale at which the media items are encoded for distribution, wherein at least two of the plurality of media items are encoded at different frame rates, identify, for the plurality of media items, a unified time scale that provides a constant frame interval for each of the plurality of media items, and change at least one of the plurality of media items from the current time scale to the identified unified time scale to provide a constant frame interval for the at least one changed media item.

Figure 19:
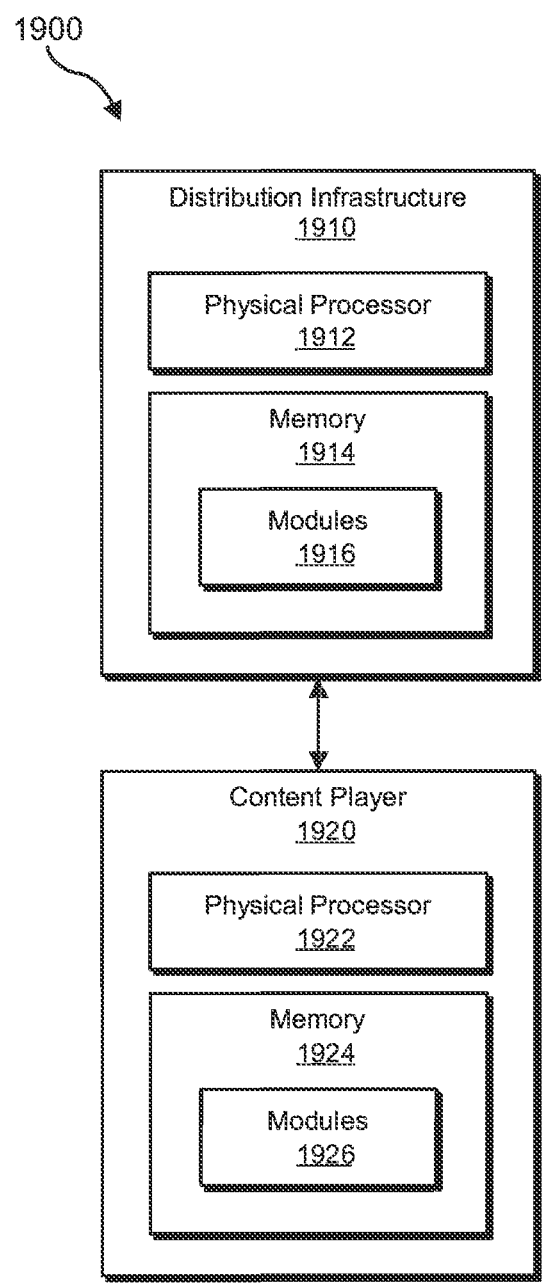
FIG. 19 is a block diagram of an exemplary content distribution ecosystem.
Figure 20:
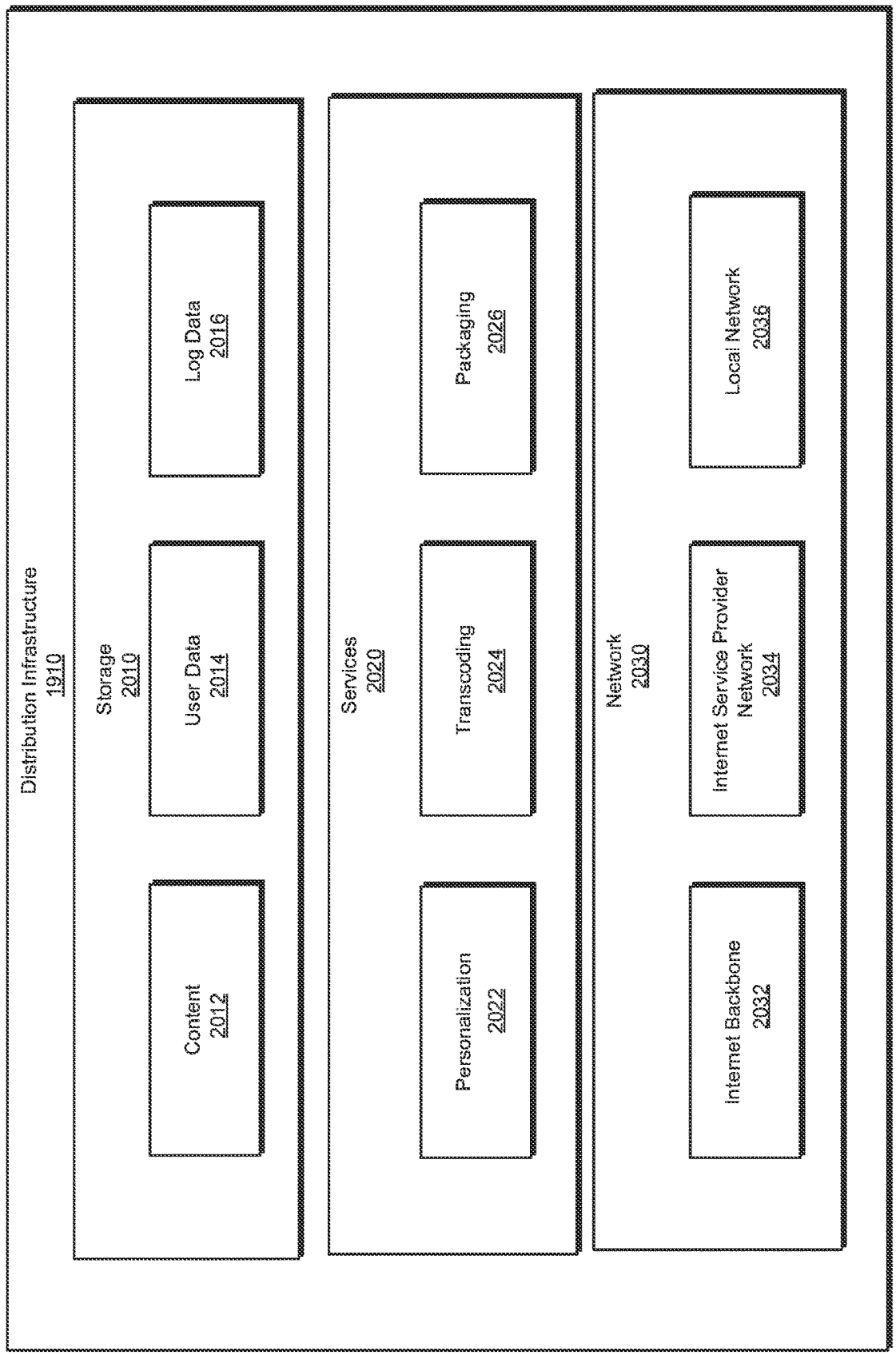
FIG. 20 is a block diagram of an exemplary distribution infrastructure within the content distribution ecosystem shown in FIG. 19.
Figure 21:
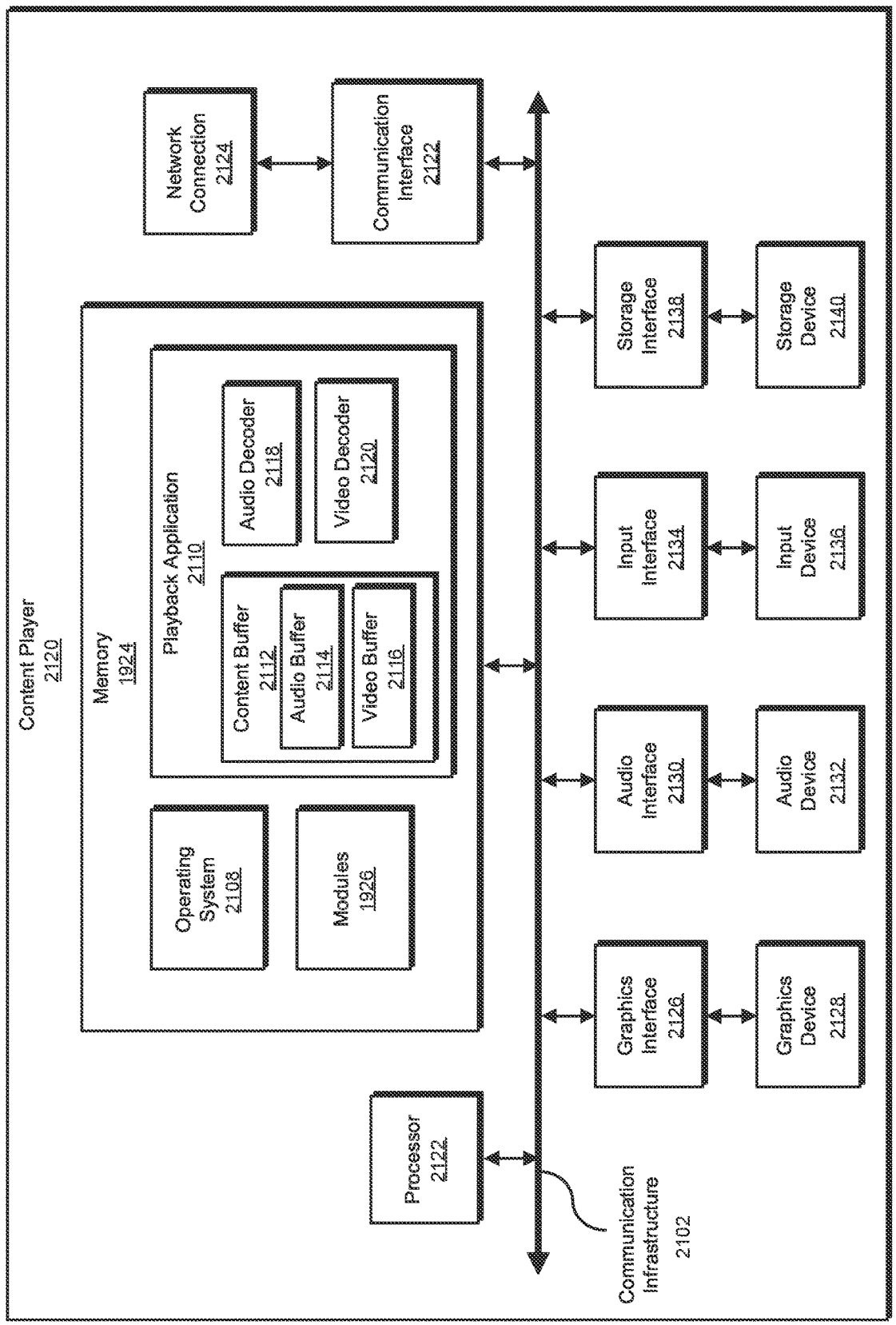
FIG. 21 is a block diagram of an exemplary content player within the content distribution ecosystem shown in FIG. 19.

The following will provide, with reference to FIG. 19, detailed descriptions of exemplary ecosystems in which content is provisioned to end nodes and in which requests for content are steered to specific end nodes. The discussion corresponding to FIGS. 20 and 21 presents an overview of an exemplary distribution infrastructure and an exemplary content player used during playback sessions, respectively. These exemplary ecosystems and distribution infrastructures are implemented in any of the embodiments described above with reference to FIGS. 1-18.

FIG. 19 is a block diagram of a content distribution ecosystem 1900 that includes a distribution infrastructure 1910 in communication with a content player 1920. In some embodiments, distribution infrastructure 1910 is configured to encode data at a specific data rate and to transfer the encoded data to content player 1920. Content player 1920 is configured to receive the encoded data via distribution infrastructure 1910 and to decode the data for playback to a user. The data provided by distribution infrastructure 1910 includes, for example, audio, video, text, images, animations, interactive content, haptic data, virtual or augmented reality data, location data, gaming data, or any other type of data that is provided via streaming.

Distribution infrastructure 1910 generally represents any services, hardware, software, or other infrastructure components configured to deliver content to end users. For example, distribution infrastructure 1910 includes content aggregation systems, media transcoding and packaging services, network components, and/or a variety of other types of hardware and software. In some cases, distribution infrastructure 1910 is implemented as a highly complex distribution system, a single media server or device, or anything in between. In some examples, regardless of size or complexity, distribution infrastructure 1910 includes at least one physical processor 1912 and at least one memory device 1914. One or more modules 1916 are stored or loaded into memory 1914 to enable adaptive streaming, as discussed herein.

Content player 1920 generally represents any type or form of device or system capable of playing audio and/or video content that has been provided over distribution infrastructure 1910. Examples of content player 1920 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 1910, content player 1920 includes a physical processor 1922, memory 1924, and one or more modules 1926. Some or all of the adaptive streaming processes described herein is performed or enabled by modules 1926, and in some examples, modules 1916 of distribution infrastructure 1910 coordinate with modules 1926 of content player 1920 to provide adaptive streaming of digital content.

In certain embodiments, one or more of modules 1916 and/or 1926 in FIG. 19 represent one or more software applications or programs that, when executed by a computing device, cause the computing device to perform one or more tasks. For example, and as will be described in greater detail below, one or more of modules 1916 and 1926 represent modules stored and configured to run on one or more general-purpose computing devices. One or more of modules 1916 and 1926 in FIG. 19 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 1912 and 1922 generally represent any type or form of hardware-implemented processing unit capable of interpreting and/or executing computer-readable instructions. In one example, physical processors 1912 and 1922 access and/or modify one or more of modules 1916 and 1926, respectively. Additionally or alternatively, physical processors 1912 and 1922 execute one or more of modules 1916 and 1926 to facilitate adaptive streaming of digital content. Examples of physical processors 1912 and 1922 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 1914 and 1924 generally represent any type or form of volatile or non-volatile storage device or medium capable of storing data and/or computer-readable instructions. In one example, memory 1914 and/or 1924 stores, loads, and/or maintains one or more of modules 1916 and 1926. Examples of memory 1914 and/or 1924 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 20 is a block diagram of exemplary components of content distribution infrastructure 1910 according to certain embodiments. Distribution infrastructure 1910 includes storage 2010, services 2020, and a network 2030. Storage 2010 generally represents any device, set of devices, and/or systems capable of storing content for delivery to end users. Storage 2010 includes a central repository with devices capable of storing terabytes or petabytes of data and/or includes distributed storage systems (e.g., appliances that mirror or cache content at Internet interconnect locations to provide faster access to the mirrored content within certain regions). Storage 2010 is also configured in any other suitable manner.

As shown, storage 2010 may store a variety of different items including content 2012, user data 2014, and/or log data 2016. Content 2012 includes television shows, movies, video games, user-generated content, and/or any other suitable type or form of content. User data 2014 includes personally identifiable information (PII), payment information, preference settings, language and accessibility settings, and/or any other information associated with a particular user or content player. Log data 2016 includes viewing history information, network throughput information, and/or any other metrics associated with a user's connection to or interactions with distribution infrastructure 1910.

Services 2020 includes personalization services 2022, transcoding services 2024, and/or packaging services 2026. Personalization services 2022 personalize recommendations, content streams, and/or other aspects of a user's experience with distribution infrastructure 1910. Encoding services 2024 compress media at different bitrates which, as described in greater detail below, enable real-time switching between different encodings. Packaging services 2026 package encoded video before deploying it to a delivery network, such as network 2030, for streaming.

Network 2030 generally represents any medium or architecture capable of facilitating communication or data transfer. Network 2030 facilitates communication or data transfer using wireless and/or wired connections. Examples of network 2030 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 20, network 2030 includes an Internet backbone 2032, an internet service provider 2034, and/or a local network 2036. As discussed in greater detail below, bandwidth limitations and bottlenecks within one or more of these network segments triggers video and/or audio bit rate adjustments.

FIG. 21 is a block diagram of an exemplary implementation of content player 1920 of FIG. 19. Content player 1920 generally represents any type or form of computing device capable of reading computer-executable instructions. Content player 1920 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 21, in addition to processor 1922 and memory 1924, content player 1920 includes a communication infrastructure 2102 and a communication interface 2122 coupled to a network connection 2124. Content player 1920 also includes a graphics interface 2126 coupled to a graphics device 2128, an input interface 2134 coupled to an input device 2136, and a storage interface 2138 coupled to a storage device 2140.

Communication infrastructure 2102 generally represents any type or form of infrastructure capable of facilitating communication between one or more components of a computing device. Examples of communication infrastructure 2102 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 1924 generally represents any type or form of volatile or non-volatile storage device or medium capable of storing data and/or other computer-readable instructions. In some examples, memory 1924 stores and/or loads an operating system 2108 for execution by processor 1922. In one example, operating system 2108 includes and/or represents software that manages computer hardware and software resources and/or provides common services to computer programs and/or applications on content player 1920.

Operating system 2108 performs various system management functions, such as managing hardware components (e.g., graphics interface 2126, audio interface 2130, input interface 2134, and/or storage interface 2138). Operating system 2108 also provides process and memory management models for playback application 2110. The modules of playback application 2110 includes, for example, a content buffer 2112, an audio decoder 2118, and a video decoder 2120.

Playback application 2110 is configured to retrieve digital content via communication interface 2122 and play the digital content through graphics interface 2126. Graphics interface 2126 is configured to transmit a rendered video signal to graphics device 2128. In normal operation, playback application 2110 receives a request from a user to play a specific title or specific content. Playback application 2110 then identifies one or more encoded video and audio streams associated with the requested title. After playback application 2110 has located the encoded streams associated with the requested title, playback application 2110 downloads sequence header indices associated with each encoded stream associated with the requested title from distribution infrastructure 1910. A sequence header index associated with encoded content includes information related to the encoded sequence of data included in the encoded content.

In one embodiment, playback application 2110 begins downloading the content associated with the requested title by downloading sequence data encoded to the lowest audio and/or video playback bitrates to minimize startup time for playback. The requested digital content file is then downloaded into content buffer 2112, which is configured to serve as a first-in, first-out queue. In one embodiment, each unit of downloaded data includes a unit of video data or a unit of audio data. As units of video data associated with the requested digital content file are downloaded to the content player 1920, the units of video data are pushed into the content buffer 2112. Similarly, as units of audio data associated with the requested digital content file are downloaded to the content player 1920, the units of audio data are pushed into the content buffer 2112. In one embodiment, the units of video data are stored in video buffer 2116 within content buffer 2112 and the units of audio data are stored in audio buffer 2114 of content buffer 2112.

A video decoder 2120 reads units of video data from video buffer 2116 and outputs the units of video data in a sequence of video frames corresponding in duration to the fixed span of playback time. Reading a unit of video data from video buffer 2116 effectively de-queues the unit of video data from video buffer 2116. The sequence of video frames is then rendered by graphics interface 2126 and transmitted to graphics device 2128 to be displayed to a user.

An audio decoder 2118 reads units of audio data from audio buffer 2114 and outputs the units of audio data as a sequence of audio samples, generally synchronized in time with a sequence of decoded video frames. In one embodiment, the sequence of audio samples is transmitted to audio interface 2130, which converts the sequence of audio samples into an electrical audio signal. The electrical audio signal is then transmitted to a speaker of audio device 2132, which, in response, generates an acoustic output.

In situations where the bandwidth of distribution infrastructure 1910 is limited and/or variable, playback application 2110 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 2126 is configured to generate frames of video data and transmit the frames of video data to graphics device 2128. In one embodiment, graphics interface 2126 is included as part of an integrated circuit, along with processor 1922. Alternatively, graphics interface 2126 is configured as a hardware accelerator that is distinct from (i.e., is not integrated within) a chipset that includes processor 1922.

Graphics interface 2126 generally represents any type or form of device configured to forward images for display on graphics device 2128. For example, graphics device 2128 is fabricated using liquid crystal display (LCD) technology, cathode-ray technology, and light-emitting diode (LED) display technology (either organic or inorganic). In some embodiments, graphics device 2128 also includes a virtual reality display and/or an augmented reality display. Graphics device 2128 includes any technically feasible means for generating an image for display. In other words, graphics device 2128 generally represents any type or form of device capable of visually displaying information forwarded by graphics interface 2126.

As illustrated in FIG. 21, content player 1920 also includes at least one input device 2136 coupled to communication infrastructure 2102 via input interface 2134. Input device 2136 generally represents any type or form of computing device capable of providing input, either computer or human generated, to content player 1920. Examples of input device 2136 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 1920 also includes a storage device 2140 coupled to communication infrastructure 2102 via a storage interface 2138. Storage device 2140 generally represents any type or form of storage device or medium capable of storing data and/or other computer-readable instructions. For example, storage device 2140 is a magnetic disk drive, a solid-state drive, an optical disk drive, a flash drive, or the like. Storage interface 2138 generally represents any type or form of interface or device for transferring data between storage device 2140 and other components of content player 1920.

EXAMPLE EMBODIMENTS

1. A computer-implemented method comprising: determining, for each of a plurality of different media items, a current time scale at which the media items are encoded for distribution, wherein at least two of the plurality of media items are encoded at different frame rates, identifying, for the plurality of media items, a unified time scale that provides a constant frame interval for each of the plurality of media items, and changing at least one of the plurality of media items from the current time scale to the identified unified time scale to provide a constant frame interval for the at least one changed media item.

2. The computer-implemented method of claim 1, wherein the media items comprise video media items.

3. The computer-implemented method of claim 2, wherein the video media items are encoded at 23.97, 24, 25, 29.97, 30, 59.94, 60, 120, 240 or 300 frames per second.

4. The computer-implemented method of claim 1, wherein the media items comprise audio media items.

5. The computer-implemented method of claim 4, wherein the audio media items have a frame rate of 1024, 1536, or 2048 samples per frame.

6. The computer-implemented method of claim 1, wherein each of the plurality of media items in a specified group of media items has a specified video frame rate and audio frame rate, and wherein the unified time scale is calculated to optimize the specified video frame rate and the specified audio frame rate of the media items in the group.

7. The computer-implemented method of claim 1, wherein the unified time scale is implemented to generate one or more presentation time stamps (PTSs) for the plurality of media items.

8. The computer-implemented method of claim 6, wherein the one or more PTSs are monotonically increasing, and wherein units used in the unified time scale are selected to maximize wrap-around time for the plurality of media items.

9. The computer-implemented method of claim 8, wherein the units selected to maximize wrap-around time for the plurality of media items are selected based on video frame rate.

10. The computer-implemented method of claim 1, wherein the identified unified time scale includes a presentation time stamp (PTS) interval, and wherein the PTS interval comprises a minimum frame interval or a multiple of a minimum frame interval.

11. The computer-implemented method of claim 10, further comprising restoring the PTS interval to a specified resolution.

12. A system comprising: at least one physical processor and physical memory comprising computer-executable instructions that, when executed by the physical processor, cause the physical processor to: determine, for each of a plurality of different media items, a current time scale at which the media items are encoded for distribution, wherein at least two of the plurality of media items are encoded at different frame rates, identify, for the plurality of media items, a unified time scale that provides a constant frame interval for each of the plurality of media items, and change at least one of the plurality of media items from the current time scale to the identified unified time scale to provide a constant frame interval for the at least one changed media item.

13. The system of claim 12, wherein the identified unified time scale allows the plurality of media items to be streamed at a variable frame rate while maintaining the constant frame interval.

14. The system of claim 13, wherein media items with different frame rates are streamed at a variable frame rate while maintaining the constant frame interval for each frame rate using the unified time scale.

15. The system of claim 12, wherein media items having video content that was captured using a variable refresh rate are streamed at a variable frame rate while maintaining the constant frame interval for each frame rate using the unified time scale.

16. The system of claim 12, wherein identifying the unified time scale includes converting one or more input presentation time stamps (PTSs) from the plurality of different media items having different time scales into PTSs based on the unified time scale.

17. The system of claim 16, wherein implementing the converted input PTSs avoids PTS counter wrap-around.

18. The system of claim 12, wherein changing at least one of the plurality of media items from the current time scale to the identified unified time scale allows a single fixed V-Synch interrupt to be implemented during playback of the plurality of media items.

19. The system of claim 12, further comprising optimizing PTSs for the plurality of media items, such that scaled presentation time stamps match native PTSs without a resulting rounding error under proper time scale.

20. A non-transitory computer-readable medium comprising one or more computer-executable instructions that, when executed by at least one processor of a computing device, cause the computing device to: determine, for each of a plurality of different media items, a current time scale at which the media items are encoded for distribution, wherein at least two of the plurality of media items are encoded at different frame rates, identify, for the plurality of media items, a unified time scale that provides a constant frame interval for each of the plurality of media items, and change at least one of the plurality of media items from the current time scale to the identified unified time scale to provide a constant frame interval for the at least one changed media item.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to determine optimized time scales, use the result of the transformation to generate accurate presentation time stamps, and store the result of the transformation.

Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    determining, for each of a plurality of different media items, a current time scale at which the media items are encoded for distribution, wherein at least two of the plurality of media items are encoded at different frame rates;
    identifying, for the plurality of media items, a unified time scale that provides a constant frame interval for each of the plurality of media items, the identifying including determining a minimum number of time units per second at which the unified time scale is uniform for the plurality of media items; and
    changing at least one of the plurality of media items from the current time scale to the identified unified time scale to provide a constant frame interval for the at least one changed media item.

2. The computer-implemented method of claim 1, wherein the media items comprise video media items.

3. The computer-implemented method of claim 2, wherein the video media items are encoded at 23.97, 24, 25, 29.97, 30, 59.94, 60, 120, 240 or 300 frames per second.

4. The computer-implemented method of claim 1, wherein the media items comprise audio media items.

5. The computer-implemented method of claim 4, wherein the audio media items have a frame rate of 1024, 1536, or 2048 samples per frame.

6. The computer-implemented method of claim 1, wherein each of the plurality of media items in a specified group of media items has a specified video frame rate and audio frame rate, and wherein the unified time scale is calculated to optimize the specified video frame rate and the specified audio frame rate of the media items in the group.

7. The computer-implemented method of claim 1, wherein the unified time scale is implemented to generate one or more presentation time stamps (PTSs) for the plurality of media items.

8. The computer-implemented method of claim 6, wherein the one or more PTSs are monotonically increasing, and wherein units used in the unified time scale are selected to maximize wrap-around time for the plurality of media items.

9. The computer-implemented method of claim 8, wherein the units selected to maximize wrap-around time for the plurality of media items are selected based on video frame rate.

10. The computer-implemented method of claim 1, wherein the identified unified time scale includes a presentation time stamp (PTS) interval, and wherein the PTS interval comprises a minimum frame interval or a multiple of a minimum frame interval.

11. The computer-implemented method of claim 10, further comprising restoring the PTS interval to a specified resolution.

12. A system comprising:
    at least one physical processor; and
    physical memory comprising computer-executable instructions that, when executed by the physical processor, cause the physical processor to:
        determine, for each of a plurality of different media items, a current time scale at which the media items are encoded for distribution, wherein at least two of the plurality of media items are encoded at different frame rates;
        identify, for the plurality of media items, a unified time scale that provides a constant frame interval for each of the plurality of media items, the identifying including determining a minimum number of time units per second at which the unified time scale is uniform for the plurality of media items; and
        change at least one of the plurality of media items from the current time scale to the identified unified time scale to provide a constant frame interval for the at least one changed media item.

13. The system of claim 12, wherein the identified unified time scale allows the plurality of media items to be streamed at a variable frame rate while maintaining the constant frame interval.

14. The system of claim 13, wherein media items with different frame rates are streamed at a variable frame rate while maintaining the constant frame interval for each frame rate using the unified time scale.

15. The system of claim 12, wherein media items having video content that was captured using a variable refresh rate are streamed at a variable frame rate while maintaining the constant frame interval using the unified time scale.

16. The system of claim 12, wherein identifying the unified time scale includes converting one or more input presentation time stamps from the plurality of different media items having different time scales into PTSs based on the unified time scale.

17. The system of claim 16, wherein implementing the converted input PTSs avoids PTS counter wrap-around.

18. The system of claim 12, wherein changing at least one of the plurality of media items from the current time scale to the identified unified time scale allows a single fixed V-Synch interrupt to be implemented during playback of the plurality of media items.

19. The system of claim 12, further comprising optimizing PTSs for the plurality of media items, such that scaled presentation time stamps match native PTSs without a resulting rounding error.

20. A non-transitory computer-readable medium comprising one or more computer-executable instructions that, when executed by at least one processor of a computing device, cause the computing device to:
- determine, for each of a plurality of different media items, a current time scale at which the media items are encoded for distribution, wherein at least two of the plurality of media items are encoded at different frame rates;
- identify, for the plurality of media items, a unified time scale that provides a constant frame interval for each of the plurality of media items, the identifying including determining a minimum number of time units per second at which the unified time scale is uniform for the plurality of media items; and
- change at least one of the plurality of media items from the current time scale to the identified unified time scale to provide a constant frame interval for the at least one changed media item.

* * * * *